United States Patent [19]

Nishijima et al.

[11] Patent Number: 4,731,920
[45] Date of Patent: Mar. 22, 1988

[54] METHOD FOR MOUNTING A MAGNETIC HEAD

[75] Inventors: Yasunori Nishijima; Daisuke Mitsuhashi; Takao Miyazaki; Kenji Negishi, all of Minato, Japan

[73] Assignee: Fuji Photo Film Co., Ltd., Kanagawa, Japan

[21] Appl. No.: 877,411

[22] Filed: Jun. 23, 1986

[30] Foreign Application Priority Data

Jun. 26, 1985 [JP] Japan .................. 60-137897
Sep. 17, 1985 [JP] Japan .................. 60-205107
Sep. 17, 1985 [JP] Japan .................. 60-205108
May 21, 1986 [JP] Japan .................. 61-116917

[51] Int. Cl.⁴ .............................................. G11B 5/42
[52] U.S. Cl. ..................................... 29/603; 156/292; 156/293; 156/305; 360/104
[58] Field of Search ............... 29/603; 156/292, 293, 156/294, 305; 360/103, 104

[56] References Cited

U.S. PATENT DOCUMENTS 4,391,035  7/1983  Van de Bult .................. 29/603
4,496,416  1/1985  Mächler ....................... 156/293

Primary Examiner—Carl F. Hall
Attorney, Agent, or Firm—Parkhurst & Oliff

[57] ABSTRACT

A method and a structure for mounting to a head carriage a magnetic head applicable to a magnetic recorder or reproducer in an electronic camera system wherein an object is electronically photographed and recorded into a rotating magnetic disc and an image is reproduced by a television system or a printer. In the method and structure, a pin is inserted through a through-bore in a head mount plate and is then brought into abutment with the head carriage. Adhesives are applied to clearances between the pin and the through-bore of the head mount plate as well as between the pin and the abutment surface of the head carriage to fill them up. In the method and structure, since the head mount plate is adhesively attached to the head carriage via the pin, the resultant adhesive layers are reduced in thickness, thereby preventing the magnetic head from shifting out of position when the adhesives are hardened.

4 Claims, 29 Drawing Figures (a)  276   (b) 276

(c) 276'   (d) 276'

(e) 276"   (f) 276"

METHOD FOR MOUNTING A MAGNETIC HEAD

BACKGROUND OF THE INVENTION

1. Field of the Invention

The present invention relates to a method and a structure for mounting a magnetic head, and, more particularly, to a method and a structure for mounting a magnetic head which is applicable to a magnetic recorder or reproducer in an electronic camera system or the like.

2. Description of the Prior Art

Recently, there has been developed an attractive electronic camera system wherein an image pickup device, such as a charge coupled device (CCD), an image pickup tube or the like, is combined with a recording device employing, as a recording medium, an inexpensive magnetic disc having a comparatively higher memory capacity to photograph an object electronically and record it into the rotating magnetic disc and to reproduce an image by a television system or printer separately provided.

This type of magnetic disc for use in the electronic camera system, unlike a magnetic disc used in an ordinary magnetic recorder/reproducer, stores still or moving image information recorded therein in a high density and also rotates at a high speed. Therefore, a magnetic head, which is brought into contact with the magnetic disc to record into or reproduce from the magnetic disc, must be adjusted accurately in positioning with respect to the magnetic disc.

In view of the above-mentioned circumstances, the magnetic head used to record or reproduce the still image information and the like in the electronic camera or the like must be adjusted with respect to the magnetic disc in five respects: namely, (1) an amount of projection or extension, (2) an angle of inclination, (3) a shift in center alignment, (4) a shift in azimuth, and (5) a tilt. Among them, however, (2) the angle of inclination and (5) tilt may not be adjusted but can be dealt with only by means of so called "head aging", when they are quite small. The abovementioned five types of adjustments will be sequentially described below in connection with FIGS. 1 to 3.

In FIG. 1, numeral 10 designates a magnetic disc, 12 represents a magnetic head to record into or reproduce from the magnetic disc 10, and 14 denotes a regulating plate located at a position opposed to the magnetic head 12 with the magnetic disc 10 between to place the magnetic disc 10 along the magnetic head 12. The magnetic head 12 must have an amount of projection or extension Ea within a predetermined range with respect to the magnetic disc 10. In order to perform further better recording and reproduction as well as to prevent the magnetic head and a recording medium from wearing, the magnetic head also requires a fine adjustment.

Also, in order to be able to obtain a reproduced image in a satisfactory manner even when one and the same recording medium is loaded into different reproducers, and when the recorder and reproducer are constructed separately that is, when a recording head and a reproducing head different from each other are used, it is necessary that an angle of inclination $\theta a$ of the magnetic head relative to the magnetic disc as shown in FIG. 1, an amount of shift Eb of the magnetic head relative to the center of the magnetic disc 10 and an angle of azimuth shift $\theta b$ thereof as shown in FIG. 2, and an angle of tilt $\theta c$ of the magnetic head 12 with respect to the magnetic disc 10 as shown in FIG. 3 remain within predetermined interchangeable ranges, respectively.

In a conventional structure for mounting a magnetic head, a plurality of shims different from one another in thickness are located on a head carriage with a magnetic head previously fixed thereto so as to be able to adjust the height thereof, and, after such height adjustment, a head mounting plate is attached to the head carriage by an adhesive. In the conventional magnetic head mounting structure, however, since the head mounting plate is in surface-to-surface contact with the head carriage, when the thickness of the adhesive layer is equal to 100 $\mu m$ or more, then temperature variations or variations due to shrinkage during hardening may put the magnetic head out of place. Also, when the magnetic head is mounted using the shims, it takes time to insert the shims. Further, the above-mentioned conventional head mount structure is disadvantageous in that the machining accuracies of the shims have a great effect on the mounting accuracy of the magnetic head.

SUMMARY OF THE INVENTION

The present invention aims at eliminating the drawbacks found in the above-mentioned conventional magnetic head mounting method and the mounting structure.

Accordingly, it is a primary object of the invention to provide a method and a structure for mounting a magnetic head which is capable of minimizing the thickness of the above-mentioned adhesive layer and the dimensional variations thereof during hardening and yet increasing the strength thereof.

To attain the above object, according to the present method, at first a head mounting plate with a magnetic head attached previously thereto is located by an adjust jig in a predetermined position relative to a head carriage. Next, a rod-like connecting member is inserted through a through-bore formed in the head mounting plate and the leading end of the connecting member is brought into contact with the head carriage. Then, a clearance between the leading end of the connecting member and the contact surface of the head carriage as well as a clearance between the connecting member and the through-bore are filled up with adhesives.

According to the present structure, a head mounting plate is employed to which a magnetic head has been previously attached. The head mounting plate is formed with at least one through-bore. A rod-shaped connecting member is inserted through the through-bore of the head mounting plate and is brought into contact with a head carriage. A clearance produced between the connecting member and the through-bore of the head mounting plate as well as a clearance between the connecting member and the contact surface of the head carriage are filled up with adhesives which are in turn solidified or hardened.

Thus, according to the magnetic head mounting method and structure of the invention arranged in the above-mentioned manner, since the head mounting plate is adhesively secured to the head carriage by means of the rod-shaped connecting member, the thickness of the adhesive layer can be minimized, thereby keeping the magnetic head in position when the adhesives are hardened.

Also, in order to accomplish the above object, the invention provides a structure for mounting a magnetic head attached to a carriage and movable in a radial direction of a rotating, disc-shaped recording medium to record into or reproduce the disc-shaped recording medium, the structure comprising a carriage formed with a projected portion, a mounting plate with a magnetic head fixed to one end thereof, and a connecting member having a U-shaped section and formed on the top surface thereof with an opening permitting arrangement of the projected portion of the carriage with a slight clearance being kept therebetween, characterized in that the projected portion of the carriage is adhesively attached to the peripheries of the opening of the connecting member and both ends of the connecting member are adhesively attached to the upper surface of the mounting plate.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 25 is an explanatory view of a modified version of the embodiment shown in FIG. 24; and, FIGS. 26 to 28 are respectively sectional views of another embodiments adapted to mount the head mounting plate to the head carriage without using any intermediate medium such as a washer, a tubular body or the like.

DETAILED DESCRIPTION OF THE INVENTION

Detailed description will hereunder be given of the preferred embodiments according to the present invention with reference to the accompanying drawings.

Figure 1:
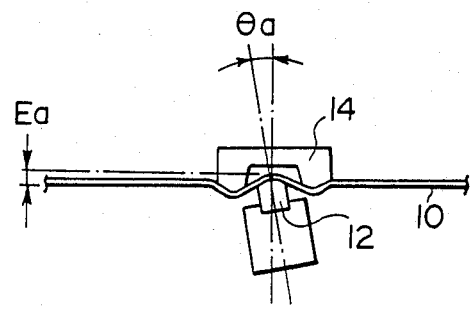
FIG. 1 is an explanatory view showing a projection amount and an inclination angle of a magnetic head.
Figure 2:
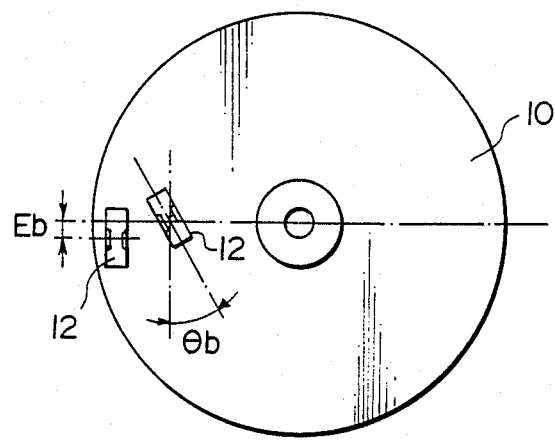
FIG. 2 is an explanatory view showing a shift in center-alignment and a shift in azimuth of the magnetic head.
Figure 3:
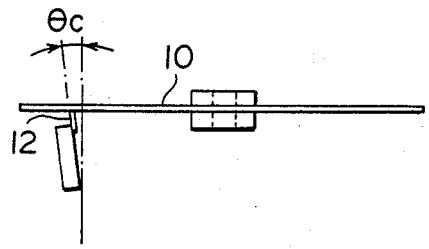
FIG. 3 is an explanatory view showing a tilt angle of the magnetic head.
Figure 4:
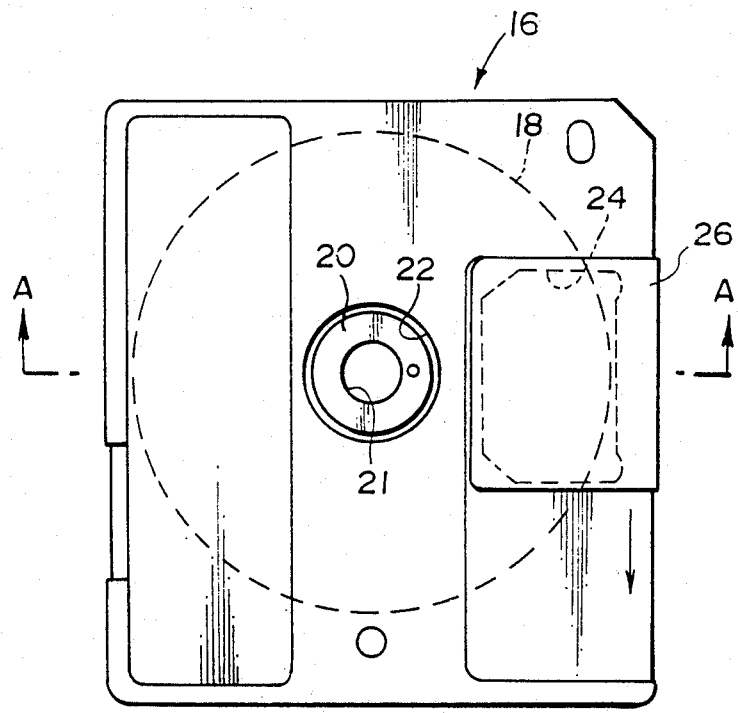
FIG. 4 is a plan view of a magnetic disc pack.
Figure 5:
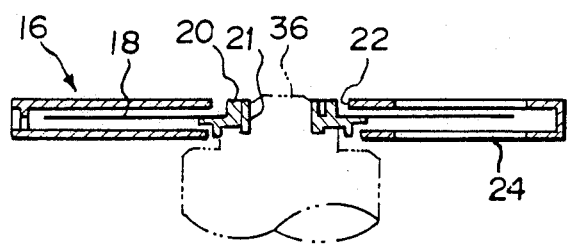
FIG. 5 is a section view of the magnetic disc pack taken along line A—A in FIG. 4.

In FIG. 4, there is shown a plan view of a magnetic disc pack used in a magnetic recorder or reproducer in an electronic camera or the like, and in FIG. 5 there is shown a sectional view taken on line A—A in FIG. 4. As shown in FIG. 4, the magnetic disc pack 16 is formed into a substantially square shape and a magnetic disc 18 capable of recording therein still image information and the like is rotatably stored within the magnetic disc pack 16. The magnetic disc 18 is provided in the central portion thereof with a center core 20 serving as a reinforcing member, which center core 20 is exposed to the outside through a circular opening 22 in the magnetic disc pack 16 and is pivotally supported by the circular opening 22. The magnetic disc pack 16 is formed with a window 24 where a magnetic head to be described later is located. The window 24 for the magnetic head can be opened or closed by a slidable shutter 26. More specifically, before the magnetic disc pack 16 is inserted into an inner bucket to be described later, the shutter 26 closes the window 24 to prevent dust from being attached to the magnetic disc 18, and, after insertion of the disc pack 16 into the inner bucket, the shutter 26 moves downwardly in FIG. 4 to open the window 24 for the magnetic head, thereby permitting recording into and reproducing from the magnetic disc 18.

Figure 6:
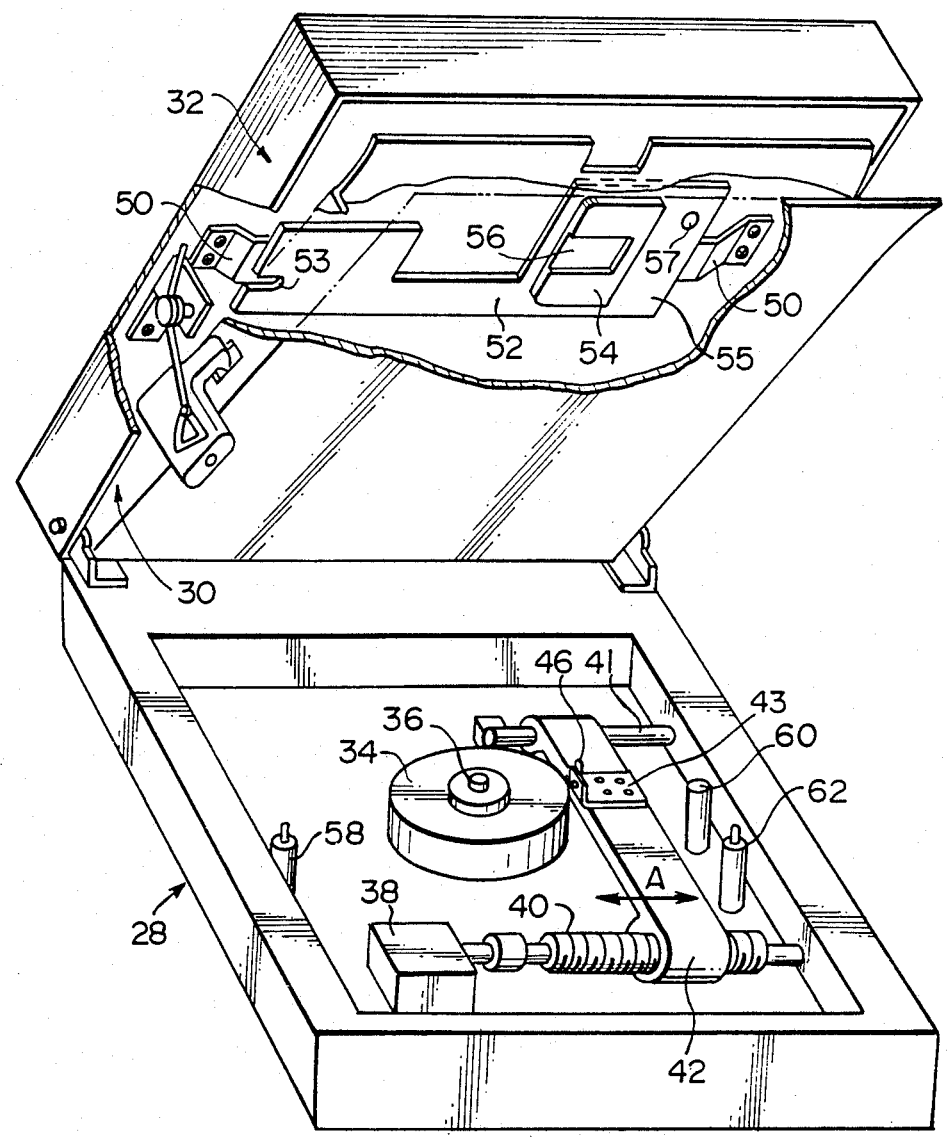
FIG. 6 is a perspective view of a magnetic disc device.

Referring now to FIG. 6, there is illustrated a magnetic recorder or reproducer in an electronic camera or the like, to which is applied a device for loading or unloading the magnetic disc pack according to the present invention. The illustrated magnetic recorder or reproducer includes a main body 28, an inner bucket 30 and a lid 32. At first, the inner construction of the main body 28 will be described. The main body 28 is equipped therein with a motor 34 for driving the magnetic disc 18. When the lid 32 is shut, a drive shaft 36 of the motor 34 is coupled into a center hole 21 formed in the center core 20 of the magnetic disc pack 16 shown in FIG. 5 to rotate the magnetic disc 18 at a given number of rotations within the magnetic disc pack 16. In FIG. 6, 38 designates a motor for driving the magnetic head, 40 a lead screw connected to an output shaft of the motor 38, 41 a guide shaft, 42 a head carriage threadedly coupled to and movable by the lead screw 40, and 46 a magnetic head mounted to the head carriage 42 through an L-shaped head mounting plate 43 and a head block 45. Thus, when the motor 38 is rotated at a given number of revolutions, then the head carriage 42 is moved by a given pitch in the axial direction of the guide shaft 41 by the rotation of the lead screw 40 to thereby move the magnetic head 46 in the radial direction of the magnetic disc 18 (that is, a direction of an arrow A), so that circular or spiral tracks are formed on the magnetic disc 18 to allow the still image information to be recorded into or reproduced from the magnetic disc 18.

The lid 32 is provided on the back surface thereof with leaf springs 50, 50 which are respectively bent formed in a crank shape and are spaced a predetermined interval from each other. A regulating plate holder 52 is secured to these leaf springs 50, 50. The regulating plate holder 52 has a length corresponding to substantially the overall width of the main body 28, and it is also provided with a regulating plate 54 which will be located at a position opposed to the magnetic head 46 when the lid 32 is closed. The regulating plate 54 is formed with a groove 56 extending in the moving direction of the magnetic head 46. On the other hand, on the left in FIG. 6, the main body 28 is provided with a receiving pin 58, and, on the right, it is provided with another receiving pins 60, 62. The receiving pins 58, 60 and 62 are respectively abutted against or coupled into an elongated slot 53, a holder surface 55 and a round hole 57 in the regulating plate holder 52, in the respective upper surfaces thereof, when the lid 32 is closed, so as to be able to regulate the height of the regulating plate 54 with respect to the magnetic head 46 with a predetermined distance being kept therebetween as well as to position the regulating plate 54 accurately.

Another receiving pin (not shown) of the magnetic disc pack 16 is positioned, and the magnetic disc 18 mounted to the drive shaft rotates within the magnetic disc pack 16 with no contact with the magnetic disc pack 16.

Figure 7:
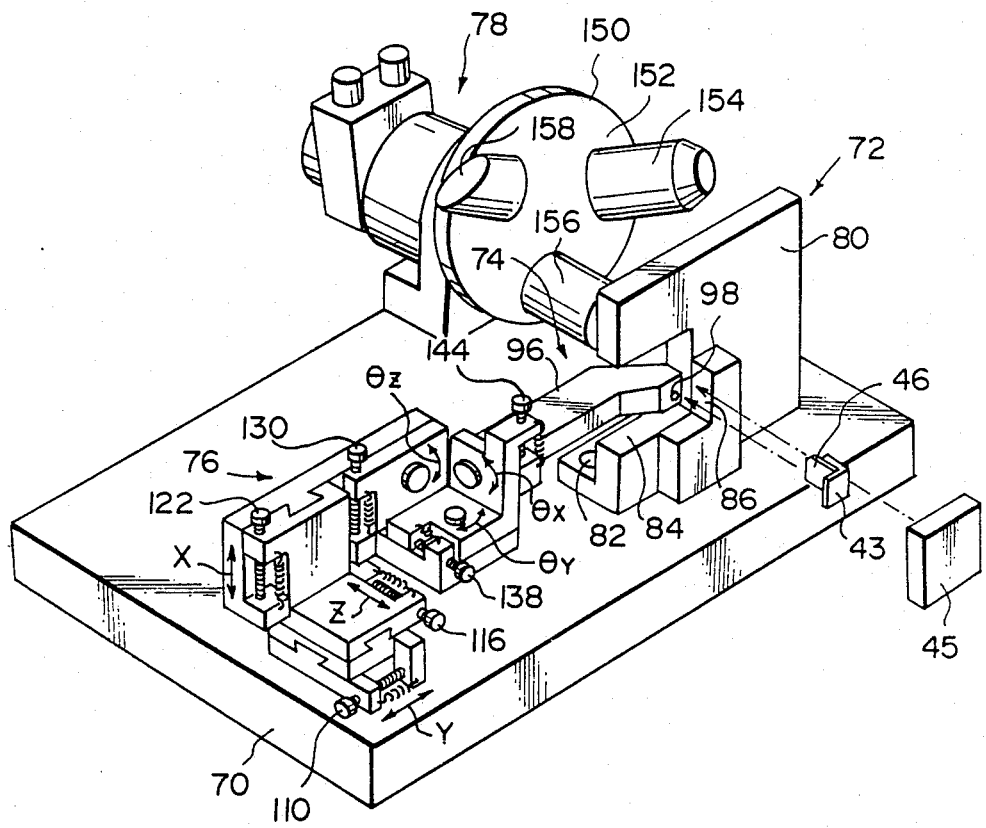
FIG. 7 is a perspective view of a six-way adjust jig.

In FIG. 7, there is shown a general structure of a jig device for adjusting the projection amount, inclination angle, shift in center alignment and tilt angle of the magnetic head. As shown in FIG. 7, the adjusting jig device comprises a base 70; a mounting jig 72 erected on the base 70 for supporting the head block 45; magnetic head holding means 74 for attracting and tentatively holding the head mounting plate 43 with the magnetic head 46 secured thereto; six-way moving means 76 capable of moving the magnetic head holding means 74 in six directions with respect to the mounting jig 72; and, optical measuring means 78 for measuring the relative position of the magnetic head 46 held by the magnetic head holding means with respect to the head block 45. The mounting jig 72 is formed of a generally L-shaped mounting plate 80, the bottom end portion of which is fixed onto the top surface of the base 70 through a screw 82. This mounting plate 80 is formed with a rectangular open window 84 in which the magnetic head holding means 74 is located in a six-way movable manner. The mounting plate 80 is also provided with an L-shaped reference surface 86 on which the head block 45 is placed.

The following is a procedure for adjustments of the projection amount, inclination angle, shift in center-alignment and tilt angle of the magnetic head using the magnetic head adjusting jig device constructed in the above-mentioned manner according to the present invention.

(1) At first, the head mounting plate 43 with the magnetic head 46 mounted thereto is attracted and tentatively held by a suction surface 98 provided at the forward end portion of an arm 96.

(2) Next, a revolver 152 is revolved to set the DI lens 156 of the objective lens section 150 of the microscope at a position for observation. In this condition, while using the interference microscope, first, second and third adjust screws 110, 116 and 122 are rotated to move the magnetic head 46 in the directions X, Y and Z, and a head gap is roughly registered with a cross line within the visual field of the microscope, whereby the magnetic head 46 is approximately positioned in the directions X, Y and Z.

Figure 8:
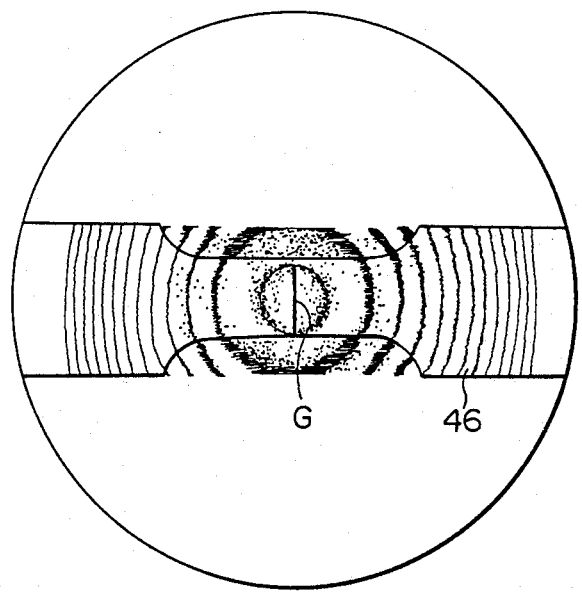
FIGS. 8 and 9 are respectively explanatory views showing a portion of a visual field provided by an interference microscope.

(3) In FIG. 8, there is shown a portion of the visual field of the interference microscope. When a gap G of the magnetic head 46 is shifted upwardly or downwardly from the center of interference or Moire fringes, the magnetic head 46 must be adjusted in tilt, and, when the gap G is shifted in the lateral direction, it requires an adjustment in inclination. More specifically, fifth and sixth adjust screws 138, 144 are rotated to rotate the magnetic head 46 in the directions of $\theta X$ (inclination) and $\theta Y$ (tilt), whereby the head gap G is registered with the center of the Moire fringes as shown in FIG. 8 to adjust the inclination and tilt of the magnetic head 46.

Figure 9:
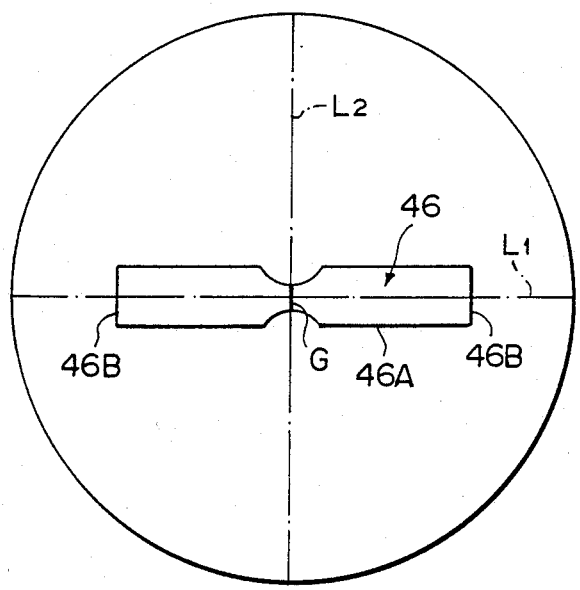

(4) Next, the revolver 152 is revolved again to set an ordinary microscope lens 154 at a position for observation. As shown in FIG. 9, an inclination of the magnetic head 46 from a lateral line L1 of the cross within the microscope visual field indicates a shift in azimuth, while a shift of the head gap G from a vertical line L2 of the cross points out a shift in center-alignment. While observing under the microscope, the adjusting screw 122 is rotated to move the magnetic head 46 in the Y direction and, further, a fourth adjusting screw 130 is rotatively operated to move the magnetic head 46 in the $\theta Z$ direction, whereby a end face 46A of the head can be adjusted to coincide with the cross lateral line L1. (Alternatively, the first adjust screw 110 is rotated to move the magnetic head 46 in the X direction, an amount of shift between the cross vertical line L2 and the head 46 is examined on both end faces 46B, 46B of the head 46, and the fourth adjust screw 130 is rotatively operated to move the magnetic head in the $\theta Z$ direction so as to adjust the magnetic head 46.) With the above-mentioned operations, the magnetic head 46 can be adjusted roughly in azimuth as well as can be adjusted in center-alignment.

(5) Then, the magnetic head 46 is moved in the X and Y directions to register the center of the head gap G with the cross within the visual field of the microscope, and the adjust screw 116 is rotatively operated to move the magnetic head 46 in the Z direction, thereby registering the magnetic head 46 with a focusing position of the microscope. The focusing position of the microscope is preset at the position of the projection amount of the head 46, and a focusing depth of the microscope is very small. Therefore, the registration of the magnetic head 46 with the focusing position of the microscope permits accurate adjustments of the projection amount of the magnetic head 46.

(6) The above-mentioned operations complete the adjustments of the magnetic head 46. Then, adhesives are applied to the bottom surface of the head mounting plate 43.

(7) In this condition, the head block 45 is placed along the reference surface 86 to regulate the direction of the head block 45, placed on the mounting plate 80, and secured adhesively to the bottom surface of the head mounting plate 43.

(8) Next, air suction is stopped to remove the head block 45 from the suction surface 98.

The above-described operations complete the mounting of the magnetic head to the head block 45 as well as the adjustments thereof in the projection amount, inclination, shift in center-alignment and tilt.

Figure 10:
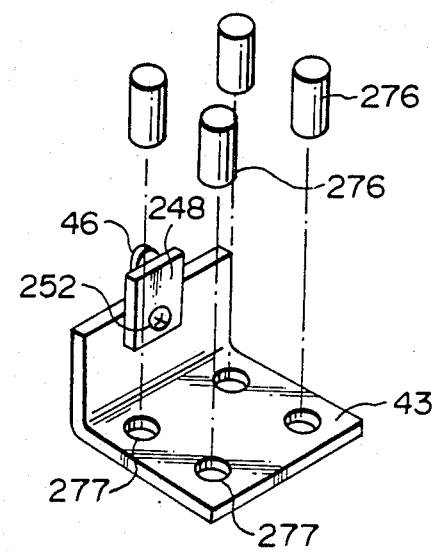
FIG. 10 is an exploded, perspective view of an embodiment of the invention.
Figure 10:
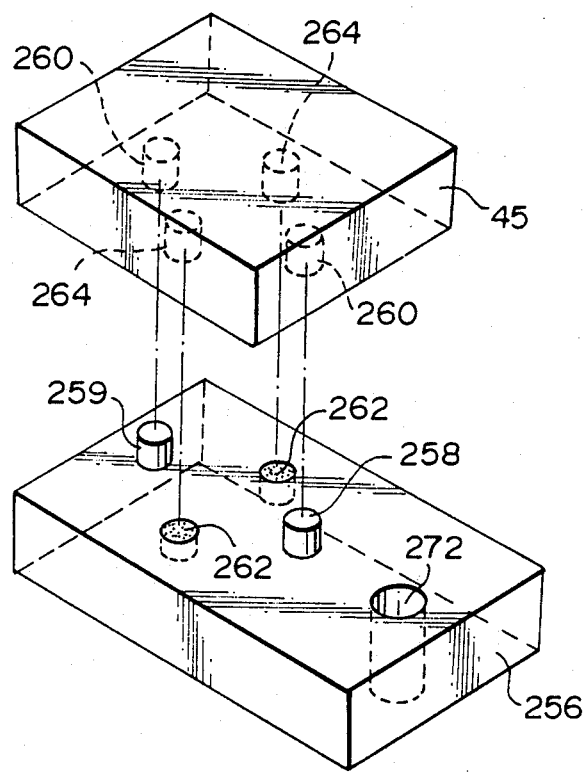
Figure 11:
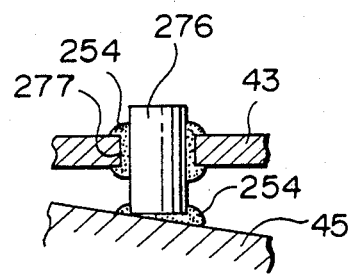
FIG. 11 is a partially sectional view of the above embodiment, showing how it is mounted.

Referring now to FIGS. 10 and 11, there is shown a structure for mounting a magnetic head in accordance with the invention: FIG. 10 illustrates an exploded perspective view thereof; and, FIG. 11 is a section view thereof to illustrate how it is mounted. Specifically, the magnetic head 46 is fixed to a head base 248 which is in turn mounted to the head mount plate 43. That is, the head mount plate 43 is bent formed in an L shape in cross section, to the rising piece of which is screwed the head base 248 with the magnetic head 46 mounted thereto by means of a screw 252. The thus constructed head mounting plate 43, after the above-mentioned adjustments of the magnetic head 46 in projection amount, inclination, shift in center-alignment and tilt, is secured to the head block 45 using four pins 276 in the following manner. That is, the head mounting plate 43 is formed with four through-bores 277. The four pins 276 are respectively inserted through these four through-bores 277 and are in abutment with the head block 45. As shown in FIG. 11, anaerobic adhesives 254 are poured into clearances between the pin 276 and through-bore 277 as well as between the pin 276 and head block 45 or the contact surfaces thereof, and are then hardened there. In order to be able to adjust the attitude of the magnetic head 46, it is necessary to position the head mount plate 43 with respect to the head block 45 at an interval of approximately 3–4 mm therefrom. In this respect, in the prior art, a surface-to-surface contact is employed, requiring a thicker adhesive layer. However, such thick adhesive layer varies greatly in dimension when hardened. Also, with the prior art, it takes much time to perform necessary operations because of the use of shims. In contrast, according to the invention, due to the fact that the anaerobic adhesives 254 are poured into and hardened in the clearances produced after the pin 276 is abutted against the head block 45, a thin adhesive layer having a thickness of about 0–10 μm or less can be obtained which is advantageous in that it varies little in dimension when hardened.

Also, when compared with a bonding agent of an ultraviolet ray curing type (which requires about 30 minutes to cure or harden), the anaerobic adhesives employed in this embodiment can be cured quickly, that is, in 5–6 minutes, which permits reduction of the operation time and also eliminates the need for provision of an ultra-violet ray irradiation device. Since the adhesive layer in accordance with the invention is smaller in thickness than that in the prior art, even the anaerobic adhesives can be hardened positively to the innermost portions thereof. In the invention, although the adhesive area is smaller over the prior art, the pin 276 is always in contact with the head block 45, whereby higher strength and accuracy can be obtained over the prior art. For further higher accuracies, the plurality of pins 276 may be located at longer intervals from one another.

Figure 12:
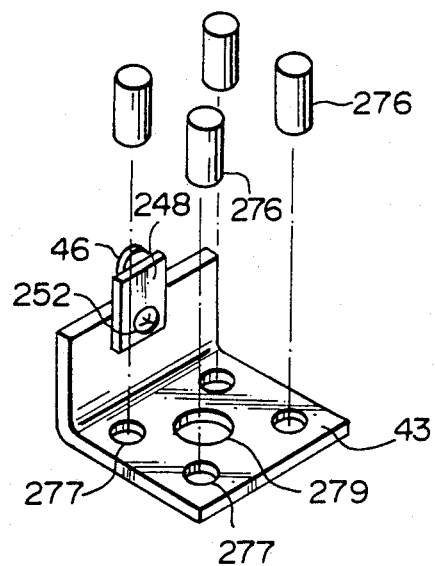
FIG. 12 is a perspective view of another embodiment of the invention.
Figure 13:
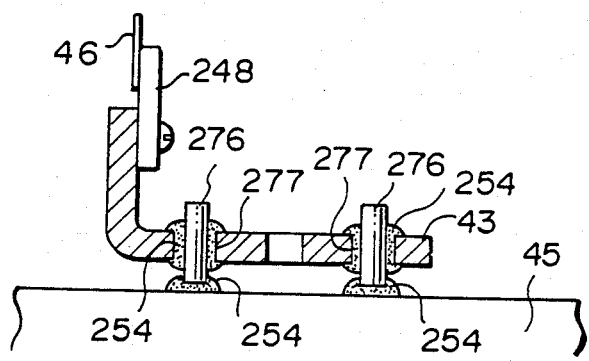
FIGS. 13 and 14 are respectively sectional views showing the above second embodiment of the invention.
Figure 14:
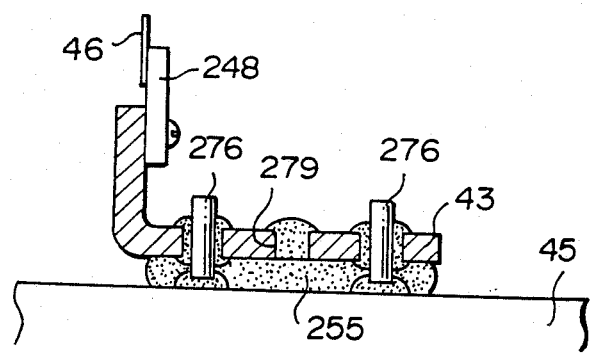

In FIGS. 12 to 14, there is shown another method of adhering the head mount plate 43. The head mount plate 43 is formed with the four through-bores 277 as well as an adhesive pouring hole 279. This adhering method comprises two steps. Specifically, the head mount plate 43 is temporarily secured to the head block 45 by filling up clearances between the through-bores 277 and the pins 276 as well as clearances between the pins 276 and the head block 45 with an adhesive (e.g., an instantaneous adhesive) 254. After the adhesive 254 is hardened and thus the head mount plate 43 is completely secured to the head block 45, an adhesive 255 is poured through the poring hole 279 to fill up a clearance between the head mount plate 43 and the head block 45 with the adhesive 255. In this case, the adhesive 255 may be a slow cure adhesive or a rapid cure adhesive. This adhesive 255 has an effect to increase the shock resistance of the magnetic head 46. That is, even when the head 46 happens to collide with something and, as a result, a shearing force is caused to act on the head 46, there is no possibility that the head mount plate 43 may be removed from the head block 45. Also, since the head mount plate 43 has previously secured in a provisional manner, when the adhesive 255 is cured, there is no possibility of the magnetic head 46 being shifted out of position as in the prior art.

Figure 15:
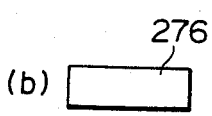
FIG. 15 is an explanatory view showing the typical shapes of pins employed in the present invention.

In this embodiment, four pins 276 are used, but this is not limitative and at least one pin may be provided. Also, in this embodiment, the pin 276 is formed in a cylindrical shape as shown in FIGS. 15(a), (b), but such pin may be formed in other shapes, such as a tubular body 276' as shown in FIGS. 15(c), (d), a tubular body 276" provided with threads on the outer peripheral surface thereof as shown in FIGS. 15(e), (f), a hexagonally cylindrical body, a hexagonally tubular body, an octagonally cylindrical body, an octagonally tubular body, a quadrilateral cylindrical body, a quadrilateral tubular body and the like. When a tubular pin 276 is used, there is an advantage that an adhesive can be easily poured through its central hole into a clearance between its contact surface with the head block 45. When a pin 276" shown in FIGS. 15(e), (f) is used, the pin 276" is threadedly inserted into the through-bore 277, thereby further improving the mechanical strength of the structure.

Figure 16:
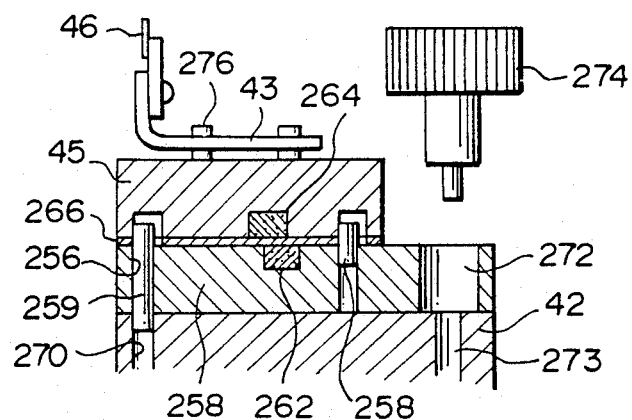
FIGS. 16 and 17 are respectively sectional views of another embodiment of the invention.

Next, we will describe a structure which is capable of removably mounting the head block 45 to the head block mount 256. Specifically, there are erected positioning pins 258, 259 on the head block mount 256, while the head block 45 is formed in the back surface thereof with positioning holes 260, 260 into which the positioning pins 258, 259 are fitted. In a direction intersecting perpendicularly to a straight line connecting the positioning pins 258, 259, a pair of magnets 262, 262 are embedded in the head block mount 256. Similarly, a pair of magnets 264, 264 are attached to the back surface of the head block 45 correspondingly to the above magnets 262, 262. The magnets 262 and 264, as shown in FIG. 16, are located with a slight shift from each other and, in a condition where the head block 45 is mounted to the head block mount 256, due to the attractive forces of the magnets 262, 264 the head block 45 is pulled to one side so as to absorb play between the positioning pins 258, 259 and the positioning holes 260, 260. Also, between the head block 45 and the head block mount 256 there is provided a spacer 266 for height adjustment. The height adjustment spacer 266 is formed of a thin stainless piece having a thickness of about 10μ. The projection amount of the magnetic head 46 can be adjusted by inserting a required number of spacers 266 between the head block 45 and head block mount 256. The spacer 266 is previously formed with holes 268, 268 through which the positioning pins 258, 259 can be inserted.

The head block mount 256, as shown in FIG. 16, is attached to the head carriage 42. Specifically, the above-mentioned positioning pin 259, which projects on the side of the head carriage 42 through the head block mount 256, is fitted into a hole 270 formed in the head carriage 42, and the head block mount 256 is rotatably supported by the pin 259. The head block mount 256 is formed with a hole 272 on the opposite side of the pin 259, and the head carriage 42 is formed with a hole 273 which is located at a position corresponding to the hole 272 but is smaller in diameter than the hole 272. Thus, by inserting an eccentric pin 274 into the hole 272 and rotating the head block mount 256, the azimuthal adjustments can be performed.

According to the embodiment of the invention constructed in the above-mentioned manner, since the head block 45 is mounted to the head block mount 256 via the magnets 262, 262, 264, 264, it can be mounted and removed simply by one touch, unlike a case where it is screwed. Also, since the magnets 262 and 264 are located shifted from each other in the biasing directions thereof, the play produced between the positioning pins 258, 259 and the positioning holes 260, 260 can be removed, so that the head block 45 can be mounted to the head block mount 256 accurately.

Figure 17:
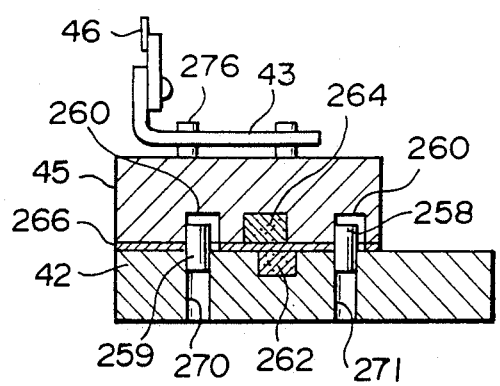

Although in the above-mentioned embodiment of the invention the head mount plate 43 is mounted to the head carriage 42 through the head block 45 and the head block mount 256, the head mount plate 43 may be attached to the head carriage 42 by other means. For example, as in a second embodiment shown in FIG. 17, the head block mount 256 may be omitted. The second embodiment is constructed similarly to the above-described first embodiment, except that the magnet 262 is embedded in the head carriage 42 at a position slightly shifted from a position corresponding to the magnet 264 in the head block 45, and that the head block mount 256 is omitted.

As has been concretely described by way of the preferred embodiments hereinbefore, according to the invention, since the head mount plate is attached via one or more pins to the head carriage by use of a very thin adhesive layer, the adhesive layer varies little in dimensions when cured, so that the attitude and projection amount of the magnetic head will never vary. Also, the invention requires only one kind of shims for adjusting the projection amount of the magnetic head. Further, it is possible to reduce the operation time by using the anaerobic adhesives.

Figure 18:
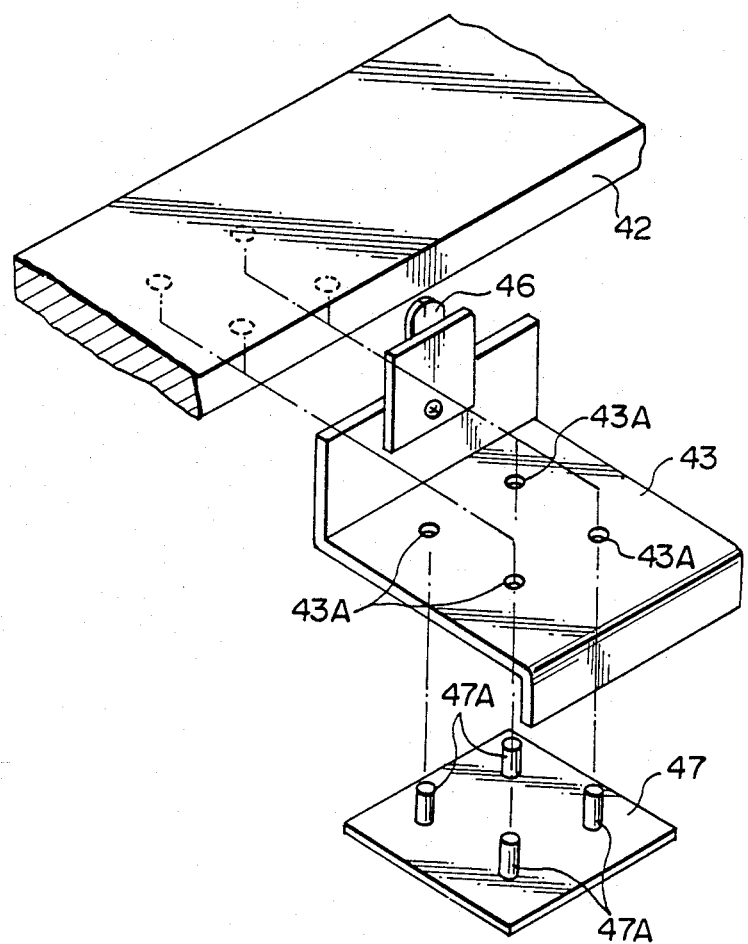
FIG. 18 is a perspective view of another embodiment of the invention.
Figure 19:
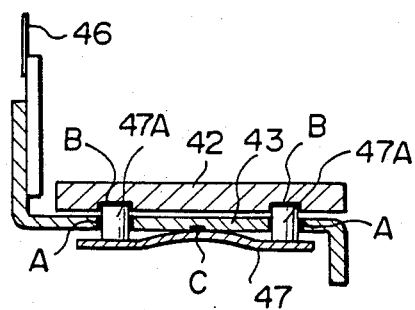
FIG. 19 is a sectional view of another embodiment of the invetnion.

Next, we will describe another structure for mounting the head mount plate 43 with the magnetic head 46 attached thereto to the head carriage 42 in connection with FIGS. 18 and 19. The head mount plate 43, as shown in FIG. 18, is mounted to the head carriage 42 via pins 47A, 47A, 47A, 47A respectively erected on the leaf spring 47. More specifically, the head mount plate 45 is formed with four through-bores 277, 277, 277, 277, respectively corresponding to the four pins 47A in the leaf springs 47. In this structure, the pins 47A, 47A, 47A, 47A are respectively inserted through the bores 277, 277, 277, 277 from the lower surface of the head mount plate 45 and are then brought into abutment with the lower surface of the head carriage 42. After then, adhesives are applied to clearances between the respective pins 47A and through-bores 277 as well as clearances between the respective upper ends of the pins 47A and the lower surface of the head carriage 42 to fixedly secure them to one another.

The following is a procedure for mounting the magnetic head using the magnetic head mounting structure constructed in the above-mentioned manner in accordance with the present invention.

(1) At first, the head mount plate 43 with the magnetic head 46 attached thereto is moved to set the magnetic head 46 at a proper position relative to the magnetic disc. That is, the head mount plate 43 with the magnetic head 46 previously attached thereto is held by the moving arm of the before-mentioned six-way adjusting jig device and, by moving this arm, the magnetic head is adjusted in tilt, inclination, azimuth, shift in center-alignment and projection amount.

(2) After the above adjustments, the head mount plate 43 is mounted to the head carriage 42 through the pins 47A, 47A, 47A, 47A respectively planted on the leaf spring 47.

In other words, the pins 47A, 47A, 47A, 47A on the leaf spring 47 are inserted into through-bores 43A, 43A, 43A, 43A from the lower surface of the head mount plate 43, respectively, and the respective upper ends of the pins 47A are then brought into abutment with the lower surface of the carriage 42. Next, adhesives A, B, C are applied respectively to clearances between the pins 47A and through-bores 43A, between the upper ends of the pins 47A and the lower surface of the head carriage 42, and between the central portion of the leaf spring 47 and the head mount plate 43, simultaneously. Thus, since the central portion of the leaf spring 47 is adhesively attached to the lower surface of the head mount plate 43, the resilient forces of the leaf spring 47 always press and bias the pins 47A against the lower surface of the head carriage 42 to thereby secure adhesively the pins 47A to the lower surface of the carriage 42 positively.

Alternatively, the adhesive C may be applied prior to application of the adhesives A, B. That is, the leaf spring 47 may be previously attached and adhesively secured to the lower surface of the head mount plate 43, and after then the pins 47A are positively abutted against the lower surface of the carriage 42 before the adhesives A and B are applied.

The above-mentioned operations complete the adjustments and mounting of the magnetic head.

Figure 20:
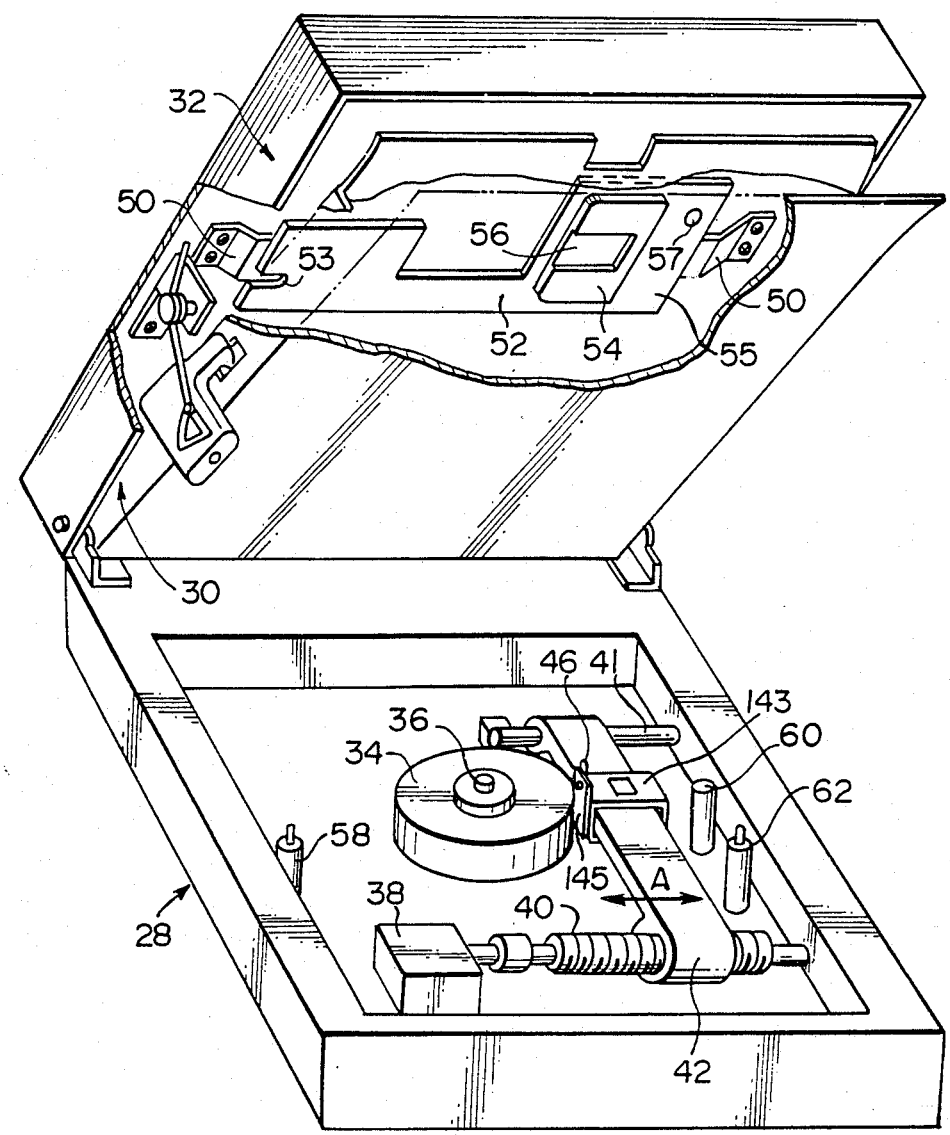
FIG. 20 is a perspective view of another embodiment of a magnetic disc device in accordance with the invention.

Now, referring to FIG. 20, there is shown a perspective view of another embodiment of a magnetic disc device. As shown in FIG. 20, a main body 28, a driving motor 38, a head carriage 42, a magnetic head 46 and the like are constructed similarly as in the magnetic disc device shown in FIG. 6. Thus, the parts in FIG. 20 that are identical with those in FIG. 6 are designated by the same numerals and the detailed description thereof are omitted here.

Figure 21:
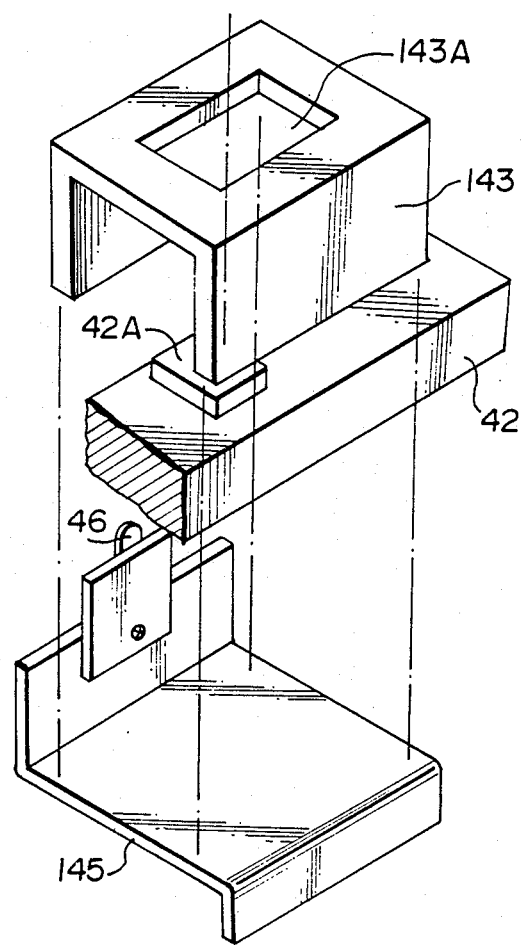
FIG. 21 is an exploded, perspective view of another embodiment of the invention.
Figure 22:
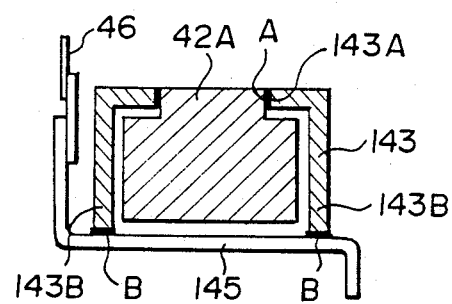
FIG. 22 is a sectional view of the embodiment shown in FIG. 21.

As shown in FIG. 21, the magnetic head 46 of the magnetic disc device is mounted to a crank metal fitting 145 and the mounting structure thereof will be explained with reference to FIGS. 21 and 22. The crank metal fitting 145 is attached to the head carriage 42 through a U-shaped connecting member 143, which, as shown in FIG. 21, is formed with an opening 143A. More specifically, the head carriage 42 is provided on the upper surface thereof with a projected portion 42A which, as shown in FIG. 22, is located in the opening 143A of the connecting member 143 and is adhesively attached to the periphery of the opening 143A of the connecting member 143, while both of the lower ends 143B, 143B of the connecting member 143 are adhesively attached onto the upper surface of the crank metal fitting 145. The lower end of the crank metal fitting 145 is bent to facilitate operations for adjustments (that is, the bent end portion can be held by hand for mount and removal of the crank metal fitting 145).

The following is a procedure for mounting the magnetic head using the magnetic head mounting structure constructed in accordance with the invention and in the above-mentioned manner.

(1) First, the crank-shaped metal fitting 145 with the magnetic head 46 attached thereto is moved to set the magnetic head 46 at a proper position with respect to the magnetic disc. That is, the crank metal fitting 145, to which the magnetic head 46 has previously been attached, is held by a moving arm provided in a six-way adjusting jig (not shown) and, by moving this arm, the magnetic head 46 is adjusted in tilt, inclination, azimuth, shift in center-alignment and projection amount.

(2) After the above-mentioned adjustments of the magnetic head, the crank-like metal fitting 145 is attached to the head carriage 42 via the U-shaped connecting member 143. That is, the connecting member 143 is placed over the head carriage 42, with the projected portion 42A of the carriage 42 being positioned within the opening 143A in the connecting member 143. Then, the adhesive A is applied to a clearance between the projection portion 42A and the peripheral edge of the opening 143A, and the adhesive B is applied between the lower ends 143B of the connecting member 143 and the head carriage 42.

Simultaneous attachment (adhesion) of the projection 42A and the lower ends 143B allows both adhesive layers to be uniform with each other. Also, the two adhesive layers are different in direction from each other, and thus they are little affected by possible variations.

The above-mentioned operations complete the adjustments and mounting of the magnetic head.

Although in the above embodiment the projected portion 42A is formed so as to have a rectangular cross section, it may be formed into a pin-shaped body.

Although in the above embodiment the mounting structure has been described by way of mounting the magnetic head, the same can also be applied in mounting an element such as a light pickup element or the like requiring a high accuracy.

Figure 23:
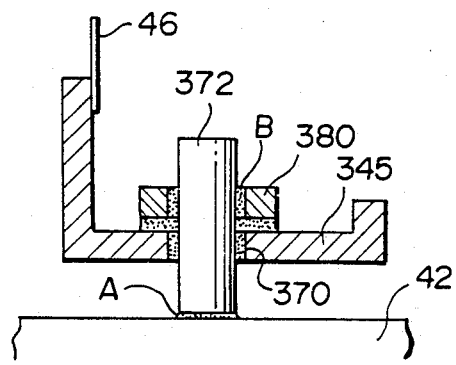
FIG. 23 is an explanatory view of another embodiment of the invention employing a washer.

Referring now to FIGS. 23 to 28, there are still another embodiments of the invention. Specifically, we will describe below a mounting structure for mounting a head mount plate 345, to which the magnetice head 46 has already been attached, to the head carriage 42. In FIG. 23, the head carriage 42 is provided with a pin 372 erected via the adhesive A on the upper surface thereof, which pin 372 is in turn inserted through a through-bore 370 in the head mount plate 345. Also, a washer 380 is disposed around the upper portion of the pin 372. The adhesive B is poured into clearances between the pin 372 and the through-bore 370, between the washer 380 and the pin 372, and between the washer 380 and the head mount plate 345. In this case, thanks to provision of the washer 380, there is eliminated a bridge structure (an excessive raising of the adhesive) due to the surface tension of the adhesive which is found in the prior art. As a result of this, the head mount plate 345 will not be elevated when the adhesive B is cured since the bridge structure is eliminated, thereby permitting an accurate mounting of the magnetic head.

Figure 24:
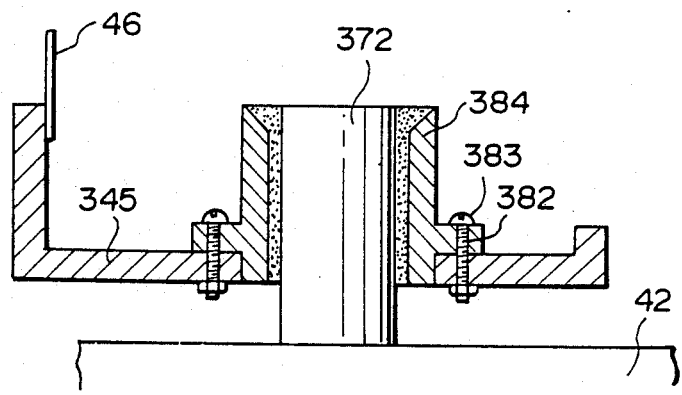
FIG. 24 is an explanatory view of another embodiment of the invention employing a tubular body with flanges.

In an embodiment shown in FIG. 24, the head mount plate 345 is equipped with a tubular body 384 having a flange 382, which tubular body 384 is fixed to the head mount plate 345 via a screw 383. The above-mentioned pin 372 is inserted into this tubular body 384 and an adhesive is poured between the pin 372 and tubular body 384. The pin 372 and tubular body 384 are formed substantially level with each other. For this reason, also in this embodiment, there is eliminated the bridge structure, so that the head mount plate 345 will not be elevated when the adhesive is hardened. Further in the embodiment of FIG. 24, a large area of adhesion is obtained between the pin 372 and tubular body 384, which permits a further firm mounting of the head mount plate 345 to the head carriage 42.

Figure 25:
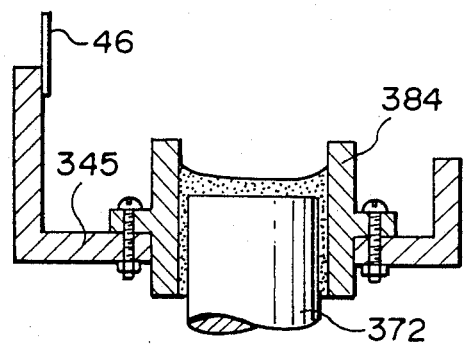

In FIG. 25, there is shown a modified version of the embodiment in FIG. 24, in which the pin 372 is reduced in height and an adhesive is poured onto the upper surface of the pin 372 to fixedly secure the pin 372 and the tubular body to each other. In this case as well, there is eliminated the bridge structure and thus there is no possibility of the head mount plate 345 being elevated during curing of the adhesive.

Figure 26:
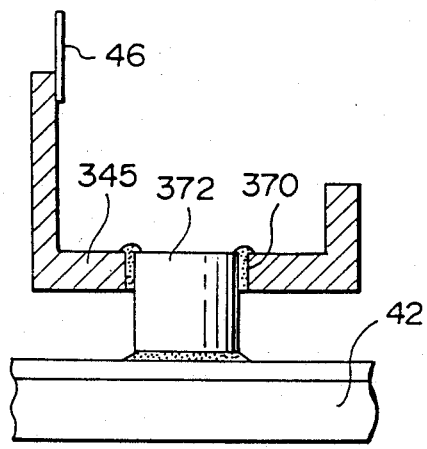
Figure 27:
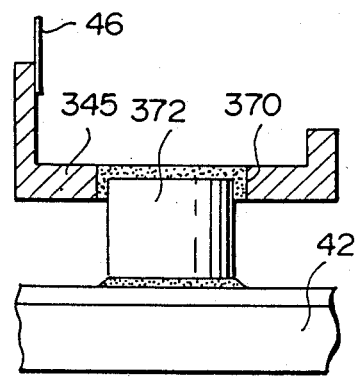
Figure 28A:
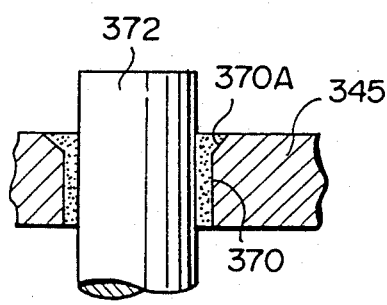

FIGS. 26 to 28 respectively illustrate further embodiments in which the head mount plate 345 is mounted to the head carriage 42 via the pin 372 directly, that is, without using any midium such as a washer, a tubular body or the like. Specifically, in FIG. 26, the upper surface of the head mount plate 345 and the upper surface of the pin 372 are formed substantially level with each other. Thus, also in this case, even the adhesive is poured into between the pin 372 and bore 370, it is possible to avoid the formation of the bridge structure of the adhesive.

In FIG. 27, the pin 372 is formed lower in height than the upper surface of the head mount plate 345 to provide a space portion between the upper surface of the pin 372 and the bore 370 in the head mount plate 345, into which space portion the adhesive is poured to adhesively secure the head mount plate 345 to the pin 372. This can avoid the formation of the bridge structure due to the surface tension of the adhesive.

Figure 28B:
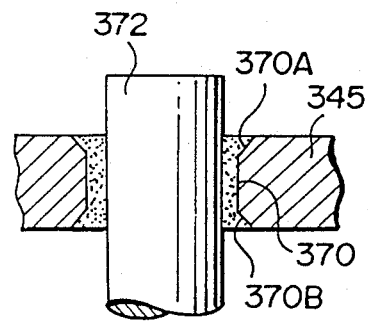

In FIG. 28, there is provided a taper edge 370A in the upper edge of the through-bore 370 to thereby eliminate the formation of the bridge structure. In FIG. 28(B), there is provided another taper edge 370B in the lower edge of the bore 370, besides the taper edge 370A. With this construction, when an adhesive of low viscosity is used, it is possible to eliminate the formation of the bridge structure which would otherwise be produced in the lower portion of the head mount plate 345.

The following is a procedure for mounting the magnetic head using the mounting structure (FIG. 23) constructed in the above-mentioned manner in accordance with the invention.

(1) First, the head mount plate 345 with the magnetic head 46 attached thereto is moved to set the magnetic head 46 at a proper position with respect to the magnetic disc. That is, the head mount plate 345, to which the magnetic head 46 has previously been attached, is held by a moving arm provided in a six-way adjusting jig (not shown), and the arm can be moved to adjust the magnetic head 46 in its tilt, inclination, azimuth, shift in center-alignment and projection amount.

(2) After the above adjustments of the magnetic head, the pin 372 erected on the head carriage 42 is inserted through the through-bore 370 in the head mount plate 345, and then the adhesive is applied to the engaged portions thereof. After then, the washer 380 is fitted to adhesively secure the pin 372, head mount plate 345 and washer 380 to one another.

The above-mentioned operations complete the adjustments and mounting of the magnetic head.

In the above-mentioned embodiments respectively shown in FIGS. 25, 26, 27, and 28, the area of the adhesive in contact with the air is small, whereby the adhesive can be cured in a shorter time than in the conventional head mounting structures.

As has been described hereinbefore, according to the magnetic head mounting method and structure of the invention, there is formed a through-bore in a head mount plate with a manetic head previously attached thereto, a rod-like connecting member is inserted through this through-bore and is then brought into abutment with the lower surface of a head carriage, and adhesives are applied between the connecting member and through-bore as well as between the the connecting member and head carriage to adhesively secure them to one another, whereby the thickness of adhesive layers produced is reduced and thus the mounting of the magnetic head can be performed simply and accurately.

Also, according to the mounting structure of the invention, a crank-like metal fitting with a magnetic head attached thereto is adhesively secured to a head carriage via a U-shaped connecting member formed with an opening for receiving a projected portion of the head carriage, whereby the area of adhesion is reduced and thus the magnetic head can be mounted simply and accurately.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of attaching a head mount plate with a magnetic head previously attached thereto to a head carriage freely movable in the radial direction of a rotating magnetic disc so as to mount said magnetic head, said method comprising the steps of:

positioning said head mount plate at a predetermined position with respect to said head carriage by use of an adjusting jig;

inserting a rod-like connecting member through a through-bore formed in said head mount plate and bringing the top end of said connecting member into abutment with said head carriage; and, applying adhesives to clearances between said top end of said connecting member and the abutment surface of said head carriage as well as between said connecting member and said through-bore in said head mount plate to fill them up.

2. A method of mounting a magnetic head as claimed in claim 1, wherein a first adhesive is applied to clearances between said connecting member top end and said head carriage abutment surface as well as between said connecting member and said head mount plate through-bore to fill them up, and, after said first adhesive is hardened, a second adhesive is applied to a clearance between said head mount plate and said head carriage to fill it up.

3. A method of mounting a magnetic head as claimed in claim 2, wherein said second adhesive is applied through a hole formed in said head mount plate.

4. A method of mounting a magnetic head as claimed in claim 3, wherein said first adhesive is a rapid cure adhesive and said second adhesive is a slow cure adhesive.

* * * * *